United States Patent
Zhao et al.

(10) Patent No.: US 12,346,558 B1
(45) Date of Patent: Jul. 1, 2025

(54) NON-VOLATILE MEMORY WITH AN ARBITRATION FUNCTION ON SHARED STATUS CHANNEL

(71) Applicant: InnoGrit Technologies Co., Ltd., Shanghai (CN)

(72) Inventors: Gang Zhao, Chandler, AZ (US); Jie Chen, Shanghai (CN); Wei Jiang, Fremont, CA (US); Lin Chen, Cupertino, CA (US)

(73) Assignee: InnoGrit Technologies Co., Ltd., Shanghai (CN)

( * ) Notice: Subject to any disclaimer, the term of this patent is extended or adjusted under 35 U.S.C. 154(b) by 102 days.

(21) Appl. No.: 18/540,664

(22) Filed: Dec. 14, 2023

(51) Int. Cl.
*G06F 3/06* (2006.01)

(52) U.S. Cl.
CPC .......... *G06F 3/0604* (2013.01); *G06F 3/0634* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 5,598,542 A * | 1/1997 | Leung | ................. | G06F 13/4031 710/45 |
| 6,828,822 B1 * | 12/2004 | Bellis | ................. | G06F 13/1605 326/38 |
| 7,000,131 B2 * | 2/2006 | Miller | ................. | G06F 13/364 713/323 |
| 7,451,263 B2 * | 11/2008 | Oh | ................. | G06F 13/1694 711/103 |
| 10,140,036 B2 * | 11/2018 | Kelner | ................. | G06F 3/0659 |
| 2022/0011979 A1 * | 1/2022 | Lim | ................. | G06F 3/0604 |

* cited by examiner

*Primary Examiner* — Elias Mamo
(74) *Attorney, Agent, or Firm* — IPro, PLLC

(57) ABSTRACT

Disclosed is a non-volatile memory and a system having a controller and two non-volatile memories. The two non-volatile memories are configured to communicate with the controller through a same channel, and to send respective status information thereof to the controller through a same line. The first non-volatile memory is configured to: determine whether the line is available for sending the status information; upon determining that the line is available, send an alert to the controller using a processor by driving the line to a first logic level for a first duration and stopping driving the line upon expiration of the first duration; upon expiration of the first duration, determine a logic level of the line; upon determining that the logic level of the line is a second logic level, send its status information to the controller through the line upon expiration of a second duration.

16 Claims, 3 Drawing Sheets

NON-VOLATILE MEMORY WITH AN ARBITRATION FUNCTION ON SHARED STATUS CHANNEL

TECHNICAL FIELD

The disclosure herein relates to a non-volatile memory (NVM) and a system having the non-volatile memory, particularly relates to a non-volatile memory sharing a channel with another device (e.g., another non-volatile memory) to communicate with a controller, and a system having the non-volatile memories and the controller.

BACKGROUND

In recent years, non-volatile memory has experienced continuously development. And Solid-State Drive (SSD) is a type of storage system having non-volatile memories.

The emergence and rise of the Solid-State Drives (SSDs) have been driving the evolution of computing systems and data centers. Unlike hard drives that depend on magnetism to store data, solid-state drives use non-volatile memories such as NAND devices to achieve data storage. Throughout this disclosure, NAND devices are used as an example of non-volatile memories but do not exclude the possibility of using other types of non-volatile memories in places of NAND devices. The NAND devices are a family of integrated circuits that are manufactured by advanced process and assembly technologies to achieve multiple levels of vertical stacking of storages units into a small footprint of package for high capacity of storage.

A typical SSD has a controller and a number of NAND devices (or other suitable non-volatile memories) on and connected through a printer circuit board (PCB) with a standard form factor for various consumer or enterprise usage models. The interface between the controller and the NAND devices is grouped into channels, and a controller usually has 4, 8 or 16 channels. To achieve higher storage capacity, more NAND devices are integrated into the PCB, which may lead to multiple NAND devices sharing a single channel to communicate with the controller.

SUMMARY

The present disclosure provides a novel scheme for a non-volatile memory to send status information to a controller.

In one embodiment of the present disclosure, there is provided a non-volatile memory comprising a processor. The non-volatile memory is configured to: communicate with a controller through a channel shared by another device that is also configured to communicate with the controller; determine whether a line between the non-volatile memory and the controller is available for sending status information of the non-volatile memory to the controller; upon determining that the line is available, send an alert to the controller using the processor by driving the line to a first logic level for a first duration and stopping driving the line upon expiration of the first duration; upon expiration of the first duration, determine a logic level of the line; upon determining that the logic level of the line is a second logic level, send the status information of the non-volatile memory to the controller through the line using the processor upon expiration of a second duration.

In another embodiment of the present disclosure, there is provided a system comprising a controller, a first non-volatile memory and a second non-volatile memory. The first non-volatile memory and the second non-volatile memory are configured to communicate with the controller through the same channel. The first non-volatile memory and the second non-volatile memory are configured to send respective status information thereof to the controller through the same line. The first non-volatile memory is configured to: determine whether the line is available for sending the status information of the first non-volatile memory to the controller through the line; upon determining that the line is available, send an alert to the controller using a processor in the first non-volatile memory by driving the line to a first logic level for a first duration and stopping driving the line upon expiration of the first duration; upon expiration of the first duration, determine a logic level of the line; upon determining that the logic level of the line is a second logic level, send the status information of the first non-volatile memory to the controller through the line using the processor upon expiration of a second duration.

DETAILED DESCRIPTION

Figure 1:
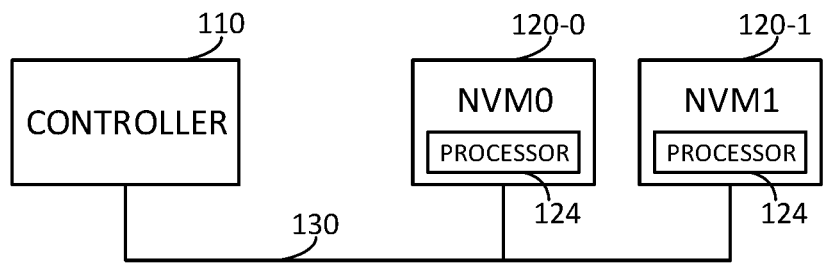
FIG. 1 schematically shows a system having non-volatile memories (NVM) in accordance with an embodiment of the present disclosure.

Embodiments according to the present disclosure will now be described in detail with references to the accompanying figures. Like elements in the various figures are denoted by like reference numerals for consistency.

For the multiple NAND devices that share a single channel to communicate with the controller, there are shared data and control signal buses connected through physical buses between the controller and the NAND devices. In addition, each NAND device has an individual Ready/Busy signal bus to indicate its status of being ready or busy to the controller. The Ready/Busy signal bus may be an open-drain signal bus that may be connected to a pull-up resistor. In an example, when the NAND device is busy, it drives the Ready/Busy signal bus to ground (a logic zero) to indicate a busy status to the controller; when the NAND device is ready, it turns off the open-drain driver of the Ready/Busy signal bus, so as to release the Ready/Busy bus to a high voltage level (a logic one) to indicate a ready status to the controller.

If each NAND device has one Ready/Busy signal bus separately connected to the controller, the controller will have too many input lines for all the NAND devices. Therefore, multiple NAND devices within a channel or across multiple channels may be connected to a common Ready/Busy signal bus to communicate with the controller. There potentially is interference on the Ready/Busy signal bus among the multiple NAND devices. Specifically, when one NAND device is busy at a given time, the Ready/Busy signal bus will be driven low. Only when all the NAND devices are ready, the Ready/Busy signal bus will be high. Therefore, the controller cannot distinguish which individual NAND devices are ready. The controller will lose bandwidth and efficiency if it waits for the Ready/Busy signal bus to go to high, which indicates all NAND devices are ready. As a result, the Ready/Busy signal bus may be unusable to the controller.

Instead of using the Ready/Busy signal bus, the controller may use a method of polling status to find out which NAND device is ready or busy. The controller may periodically send out Read Status command to the NAND devices that are processing commands, and the NAND devices will respond with a status code which indicates a specific status. The status code may be an 8-bit word that represents expanded status information including Ready, Busy, Suspend, Pass, Fail, Write Protection, etc. The potential downside of this method of polling status includes the timing overhead from when the NAND device is ready to when the NAND device is polled. It also incurs additional bandwidth overhead and power consumptions for periodically sending the Read Status commands.

Therefore, it is still desired to develop a new scheme that enables multiple non-volatile memories to communicate with a controller and provide their respective status via a shared channel.

FIG. 1 schematically shows a system having non-volatile memories (NVM) in accordance with an embodiment of the present disclosure.

The term "non-volatile memory" used in this disclosure is a logic concept, not a physical one. A non-volatile memory may have one or multiple physical dies. If two units of memory can independently exchange data with the controller, they are two non-volatile memories in the context here.

As an example, FIG. 1 shows a system in which a second non-volatile memory (NVM1) 120-1 is sharing the line 130 with a first non-volatile memory (NVM0) 120-0 to send respective status information thereof to the controller. In some embodiments, the second non-volatile memory (NVM1) 120-1 may be substituted by any other device sharing a line 130 with a first non-volatile memory (NVM0) 120-0 to send respective status information thereof to the controller. In other words, the system may comprise a non-volatile memory and another device both configured to communicate with the controller via a same line, and the other device may be another non-volatile memory or any other type of suitable devices.

As shown in FIG. 1, the system includes a controller 110, a first non-volatile memory (NVM0) 120-0 and a second non-volatile memory (NVM1) 120-1. A non-volatile memory may also be referred to as a memory device or a storage device in this disclosure. In some embodiments, the non-volatile memory (NVM) is a NAND device.

The first non-volatile memory (NVM0) 120-0 and a second non-volatile memory (NVM1) 120-1 each includes a processor 124. The processor 124 may be used to drive the line 130 to a logic level.

The system may be any system having at least two non-volatile memories. In some embodiments, the system is a solid-state drive (SSD), a flash drive, a mother board, a processor, a computer, a server, a gaming device, or a mobile device.

The first non-volatile memory (NVM0) 120-0 and the second non-volatile memory (NVM1) 120-1 are configured to communicate with the controller 110 through a same channel.

As described above, when a system has multiple non-volatile memories, the non-volatile memories are grouped into channels. And thus, two or more non-volatile memories will share a common channel.

FIG. 1 shows two non-volatile memories. It shall be understood that there might be more than two non-volatile memories sharing the same channel.

In some embodiments, each of the non-volatile memories has a unique logic identification (ID) to distinguish itself from others, and the logic identification (ID) is stored by the non-volatile memory.

In some embodiments, the controller 110 is configured to assign a unique logic identification (ID) to each of the first non-volatile memory (NVM0) 120-0 and the second non-volatile memory (NVM1) 120-1. In some embodiments, the controller 110 is configured to assign logic identification (ID) to the non-volatile memories during initiation processes. In some embodiments, the controller 110 is configured to send the respective logic IDs to the first non-volatile memory (NVM0) 120-0 and the second non-volatile memory (NVM1) 120-1, and the first non-volatile memory (NVM0) 120-0 and the second non-volatile memory (NVM1) 120-1 are configured to store their respective logic IDs. In other words, the controller 110 is configured to send a logic ID of the first non-volatile memory (NVM0) 120-0 to the first non-volatile memory (NVM0) 120-0, and the first non-volatile memory (NVM0) 120-0 is configured to store its logic ID. Similarly, the controller 110 may also be configured to send a logic ID of the second non-volatile memory (NVM1) 120-1 to the second non-volatile memory (NVM1) 120-1, and the second non-volatile memory (NVM1) 120-1 may also be configured to store its logic ID.

The controller 110 is configured to communicate with the first non-volatile memory (NVM0) 120-0 based on the status information of the first non-volatile memory (NVM0) 120-0. Similarly, the controller 110 may be configured to communicate with the second non-volatile memory (NVM1) 120-1 and/or other devices based on the status information of the second non-volatile memory (NVM1) 120-1 and/or the other devices.

In some embodiments, the controller is configured to enable or disable the first non-volatile memory (NVM0) 120-0 and the second non-volatile memory (NVM1) 120-1 based on the status information of the first non-volatile memory (NVM0) 120-0. Similarly, the controller may also be configured to enable or disable the first non-volatile memory (NVM0) 120-0 and the second non-volatile memory (NVM1) 120-1 based on the status information of the second non-volatile memory (NVM1) 120-1. For example, the controller may enable one of the first non-volatile memory (NVM0) 120-0 and the second non-volatile memory (NVM1) 120-1 to become the bus master (i.e., to control the bus) and to disable the other(s) based on the status information of the first non-volatile memory (NVM0) 120-0 and/or the second non-volatile memory (NVM1) 120-1.

As shown in FIG. 1, the first non-volatile memory (NVM0) 120-0 and the second non-volatile memory (NVM1) 120-1 are configured to send respective status information thereof to the controller 110 through the line 130. In some embodiments, the line 130 is a Ready/Busy Bus, or it may also be referred to as a "Read/Busy Signal Bus" or a "status bus".

The first non-volatile memory (NVM0) 120-0 or the second non-volatile memory (NVM1) 120-1 may determine that the line 130 is not occupied by other non-volatile memory before sending its status information.

Figure 2:
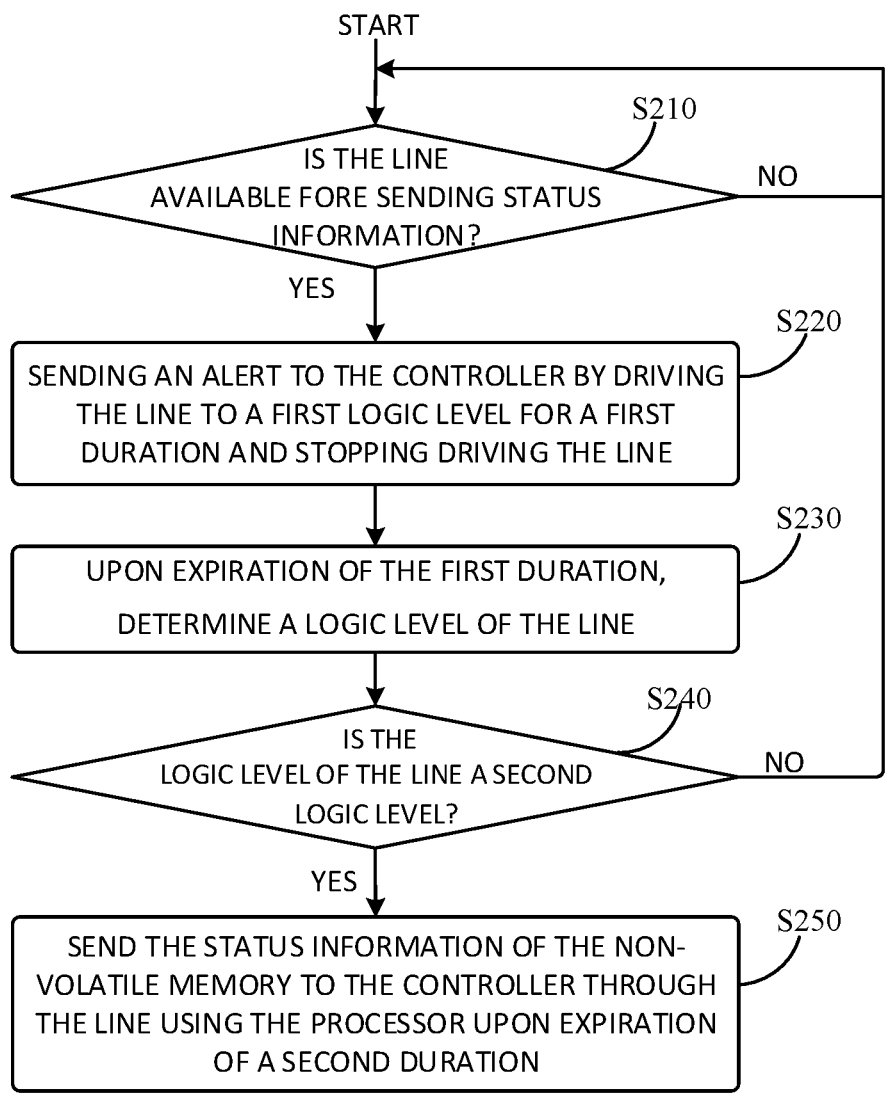
FIG. 2 is a flowchart of a process for a non-volatile memory to send its status information to the controller.

FIG. 2 is a flowchart of a process for a non-volatile memory to send its status information to the controller.

The process may be performed by any one of the non-volatile memories sharing the same line. The following description will be illustrated taking the first non-volatile memory (NVM0) 120-0 as an example. The other non-volatile memories, for example, the second non-volatile memory (NVM1) 120-1 may perform the same process while sending their respective status information to the controller.

The process starts when the first non-volatile memory (NVM0) 120-0 is about to send its status information to the controller through the shared line 130.

In step S210, the non-volatile memory determines whether the line 130 is available for sending the status information of the non-volatile memory to the controller 110 through the line 130.

Here, this determination in step S210 does not use a signal from the controller 110. The non-volatile memories themselves perform the determination, as well as the following arbitration process in steps S220 to S240.

When the line 130 is not used by any non-volatile memory to send status information, in other words, none of the non-volatile memories sharing the line 130 is occupying the line 130, the line 130 is available for sending status information.

In various embodiments, there might be different ways to determine whether the line is available. Examples of such ways will be described later.

In some embodiments, if it is determined in step S210 that the line 130 is not available, the first non-volatile memory (NVM0) 120-0 will return to the beginning of the step S210 to further determine whether the line 130 is available, until the line 130 is available. In some further embodiments, the first non-volatile memory (NVM0) 120-0 will wait for some certain duration and try again.

If it is determined in step S210 that the line 130 is available, the first non-volatile memory (NVM0) 120-0 in step S220 sends an alert to the controller 110 using the processor 124. Here, the processor 124 sends the alert by driving the line 130 to a first logic level, for example, logic "0" or "Low", for a first duration T1. The first logic level may be any of logic "0" or "1", and logic "0" does not necessarily mean logic "Low" or low voltage such as ground GND.

Upon expiration of the first duration, the processor 124 stops driving the line 130.

The expression "stops driving the line 130" does not mean setting a logic level of the line 130, but means that the processor 124 does not control the logic level of the line 130.

That the first non-volatile memory (NVM0) 120-0 stops driving the line 130 does not mean that the logic level of the line 130 will certainly go back to the second logic level, for example, logic "1" or "High". There might be some other non-volatile memory or device driving the line to the first logic level. The second logic level is opposite to the first logic level, and logic "1" does not necessarily mean logic "High" or high voltage such as a power supply voltage VDD.

In step S230, the first non-volatile memory (NVM0) 120-0 determines the logic level of the line 130, upon expiration of the first duration T1.

In some embodiments, the line 130 is configured to be at a second logic level, for example, logic "1" or "High", if no non-volatile memory is driving the line 130 and no information is being sent via the line 130.

In step S240, it is determined whether the logic level of the line 130 is the second logic level.

If it is determined in step S240 that the logic level of the line 130 is not the second logic level, the process returns to step S210 to restart the whole procedure.

If it is determined in step S240 that the logic level of the line 130 is the second logic level, which means that the first non-volatile memory (NVM0) 120-0 wins an arbitration (described in detail below) and may work as the master of the line 130, in step S250, the first non-volatile memory (NVM0) 120-0 sends its status information to the controller 110 through the line 130 using its processor 124 upon expiration of a second duration T2.

An arbitration process is performed if two or more devices, for example, the first non-volatile memory (NVM0) 120-0 or the second non-volatile memory (NVM1) 120-1, send alerts to the controller 110 by driving the line 130 to the first logic level within the length of the first duration T1. The device that sends its alert first will find that the logic level of the line 130 is still the first logic level in step S240 upon expiration of the first duration T1 of that device, because the device that sends its alert subsequently is still driving the line 130 to the first logic level. The last device that sends its alert will find that the logic level of the line 130 is the second logic level upon expiration of its own first duration T1 of that device, and thus wins the arbitration.

Figure 3:
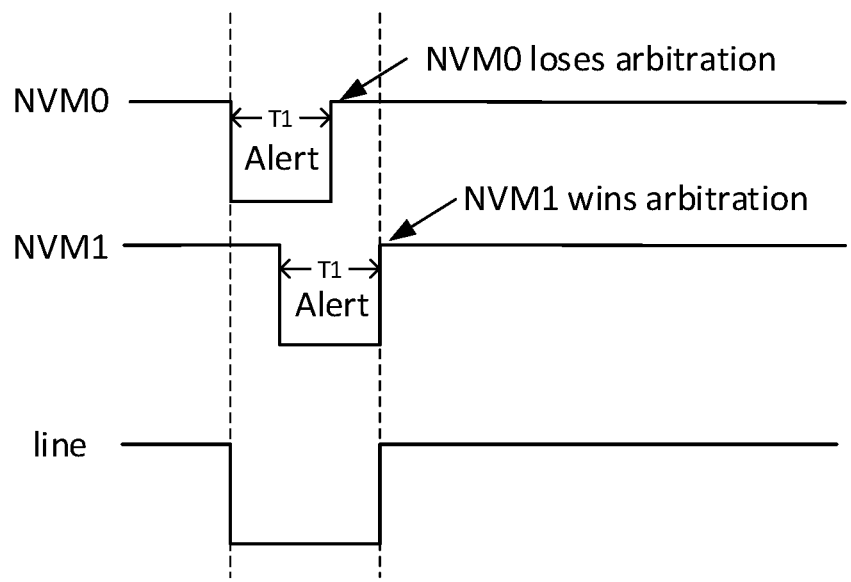
FIG. 3 shows an example of alerts and the arbitration process.

FIG. 3 shows an example of alerts and the arbitration process.

In the example as shown in FIG. 3, the first non-volatile memory (NVM0) 120-0 sends an alert to the controller 110 by driving the line 130 to a first logic level, for example, logic "0" or "Low", for a first duration T1. Before the end of the alert of the first non-volatile memory (NVM0) 120-0, the second non-volatile memory (NVM1) 120-1 sends an alert to the controller 110 by driving the line 130 to the first logic level for another first duration T1.

The line 130 maintains at the first logic level from the beginning of the NVM0's alert to the end of the NVM1's alert, and returns the second logic level, for example, logic "1" or "High" after the end of the NVM1's alert.

The first non-volatile memory (NVM0) 120-0 determines the logic level of the line 130 after the end of its alert, and finds that the logic level of the line 130 is still at the first logic level, which means that there is some other device(s), e.g., the second non-volatile memory (NVM1) 120-1 sending alert to the controller 110 by driving the line 130 to the first logic level. Accordingly, the first non-volatile memory (NVM0) 120-0 loses the arbitration.

On the other hand, the second non-volatile memory (NVM1) 120-1 determines the logic level of the line 130 after the end of its alert, and finds that the logic level of the line 130 is at the second logic level, which means that there is no further device sending alert to the controller 110. Accordingly, the second non-volatile memory (NVM1) 120-1 wins the arbitration.

In some embodiments, the detection of the logic level of the line 130 will be sustained for a period of time. In other words, the non-volatile memory may monitor the logic level of the line 130 for a period of time. In some further embodiments, the length of the period of time may be the second duration T2.

As described above, the non-volatile memory may have its unique logic identification (ID), which might be assigned by the controller 110 and sent to the non-volatile memory.

In some embodiments, the status information of the non-volatile memory comprises a logic identification of the non-volatile memory, a status code of the non-volatile memory, or both. The status code may be specified by a standard in this field.

For example, the first non-volatile memory (NVM0) 120-0 may send its logic identification first and then send its status code. There might be some duration between the end of logic identification and the beginning of the status code.

Figure 4:
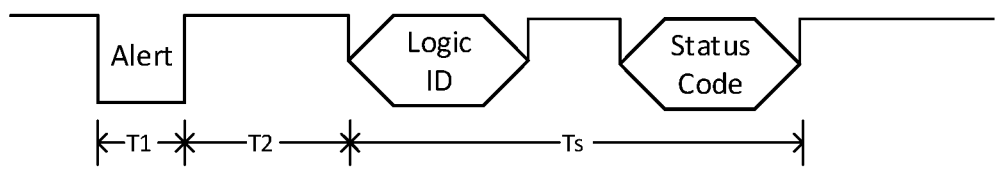
FIG. 4 shows an example of signals sent by a non-volatile memory that won the arbitration through the shared line.

FIG. 4 shows an example of signals sent by a non-volatile memory that won the arbitration through the line 130.

As shown in FIG. 4, an alert for a first duration T1 is sent through the line 130 resulting in winning of the arbitration.

After a second duration T2, the non-volatile memory starts to send status information to the controller 110 through the line 130. In the example as shown in FIG. 4, the logic ID of the non-volatile memory is sent first and the status code thereof follows. The temporal length of the status information is indicated as "Ts".

Upon receiving the status information of the first non-volatile memory (NVM0) 120-0, the controller 110 may communicate with the first non-volatile memory (NVM0) 120-0 based on the status information of the first non-volatile memory (NVM0) 120-0. Further, as described above, the controller 110 may enable or disable the first non-volatile memory (NVM0) 120-0 and the second non-volatile memory (NVM1) 120-1 based on the status information of the first non-volatile memory (NVM0) 120-0.

In some embodiments, step S210, i.e., determining whether the line 130 is available for sending status information, is performed upon determining that the logic level of the line 130 is the second logic level, for example, logic "1" or "High".

In some embodiments, the first non-volatile memory (NVM0) 120-0 is configured to determine whether the line is available by determining whether logic levels of the line 130 remain at the second logic level for a sum of the second duration T2 and the temporal length of the status information Ts, i.e., T2+Ts. If the logic levels of the line remain the second logic level for the sum, it is determined that the line is available. Otherwise, it is determined that the line is not available.

Figure 5:
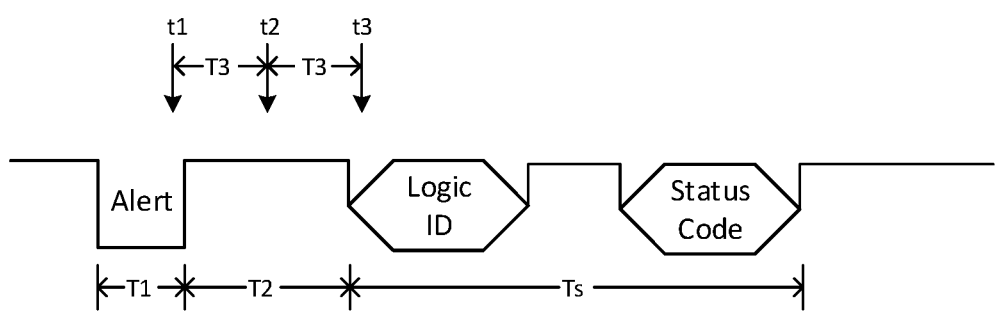
FIG. 5 schematically shows a process of determining whether the line is available.

In some embodiments, the first non-volatile memory (NVM0) 120-0 is configured to determine whether the line is available by determining whether logic levels of the line 130 at three time points. FIG. 5 shows an exemplary process of determining whether the line is available. At a first time point t1, a second time point t2 and a third time point t3, it is determined (or "polled") whether the logic level of the line 130 is the second logic level. The first time point t1 and the second time point t2 are separated by a third duration T3, and the second time point t2 and the third time point t3 are also separated by the third duration T3. The third duration T3 is shorter than the second duration T2 and is longer than one half of the second duration T2, i.e., T2/2<T3<T2. If the logic levels of the line 130 at the first time point t1, the second time point t2 and the third time point t3 are the second logic level, it is determined that the line is available for sending status information of the first non-volatile memory (NVM0) 120-0 to the controller 110. Similarly, the second non-volatile memory (NVM1) 120-1 and other devices sharing the line 130 may be configured in the same manner.

Hereinafter, an example of the system of the present disclosure is described. In the example, the system is a Solid-State Drive (SSD), the non-volatile memory (NVM) is a NAND device, the shared line is a Ready/Busy Bus, the first logic level is logic "0" or "Low" or "GND", and the second logic level is logic "1" or "High" or "VDD".

Figure 6:
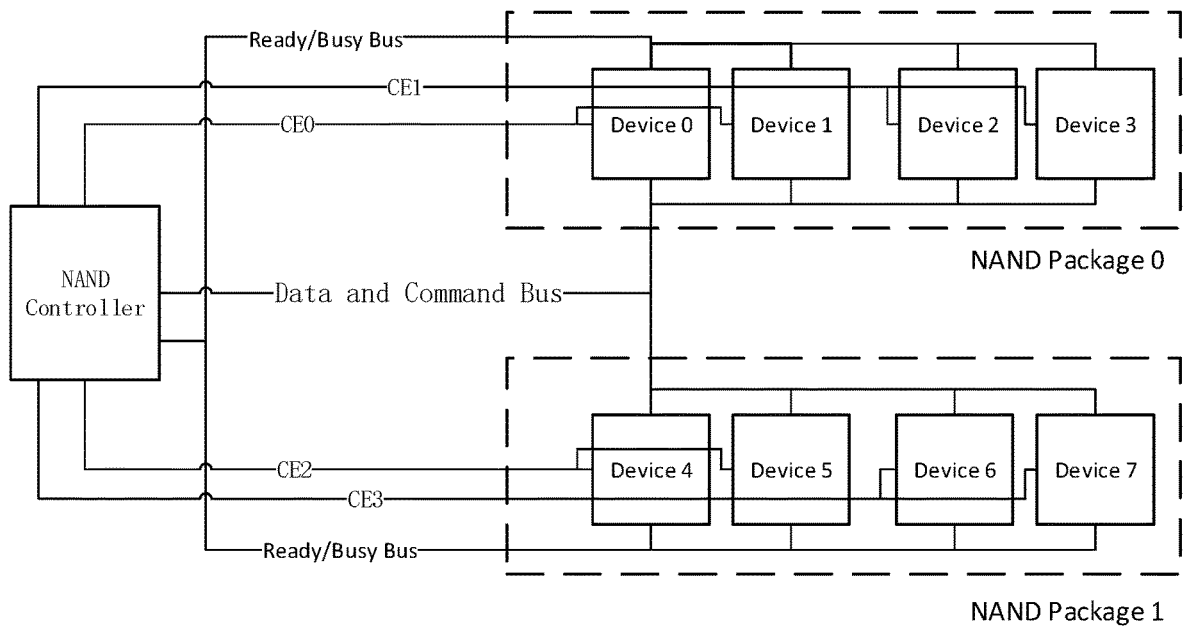
FIG. 6 is a schematic block diagram of a Solid-State Drive (SSD) having NAND devices as an example of the present disclosure.

FIG. 6 shows an example of the system according to the present disclosure, which is a Solid-State Drive (SSD) having NAND devices.

The Solid-State Drive (SSD) may comprise a NAND flash controller (or "NAND controller" or "controller") and a plurality of NAND devices. The SSD may provide data storage and/or access to stored data to a host when it is coupled to the host. The plurality of NAND devices may be connected to the NAND flash controller by a plurality of channels, although only one channel (communicated with the NAND flash controller through the same Data and Command Bus) is shown in FIG. 6.

A plurality of NAND devices can be assembled into a NAND package. The NAND devices (belonging to the one channel) share a common set of data and command bus with the NAND flash controller, including an 8-bit Data bus to transmit command, address and data, a pair of DQS differential signals, a pair of RE differential signals, as well as command signals such as ALE, CLE and WE.

As shown in FIG. 6, 8 NAND devices are grouped into two NAND Packages. Device 0, Device 1, Device 2, Device 3 are grouped into NAND Package 0, Device 4, Device 5, Device 6, Device 7 are grouped into NAND Package 1.

In an exemplary embodiment, the NAND controller may determine and assign a unique logic ID to each NAND device during NAND initiation processes. For a maximum of 16 NAND devices per channel, the logic identification (ID) may be assigned in numerical ascending order such as 4b'0000, 4b'0001, . . . , 4b'1111. The NAND device will then store this logic ID into its internal storage and will prepare to send out this logic ID to the NAND flash controller to identify itself after it alerts the NAND flash controller of its readiness and wins the arbitration of the Ready/Busy bus. This logic ID should not to be confused with the commonly known NAND manufacture ID, which includes the NAND manufacture information, device configuration and feature information.

The NAND flash controller may control and enable the individual NAND devices through a chip enable (CE) signal. In one embodiment as shown in FIG. 6, two NAND devices (LUNs) may share one CE signal and can be further addressed and distinguished by a LUN address through the Data bus. As shown in FIG. 6, NAND Device 0 and NAND Device 1 share CE0, NAND DEVICE 2 and NAND Device 3 share CE1, NAND DEVICE 4 and NAND Device 5 share CE2, NAND DEVICE 6 and NAND Device 7 share CE3. Thus, the NAND flash controller may use only 4 CE signals to control 8 individual NAND devices (LUNs).

All the 8 NAND devices are connected to the same Ready/Busy Bus to send their respective status information to the NAND flash controller.

Figure 7:
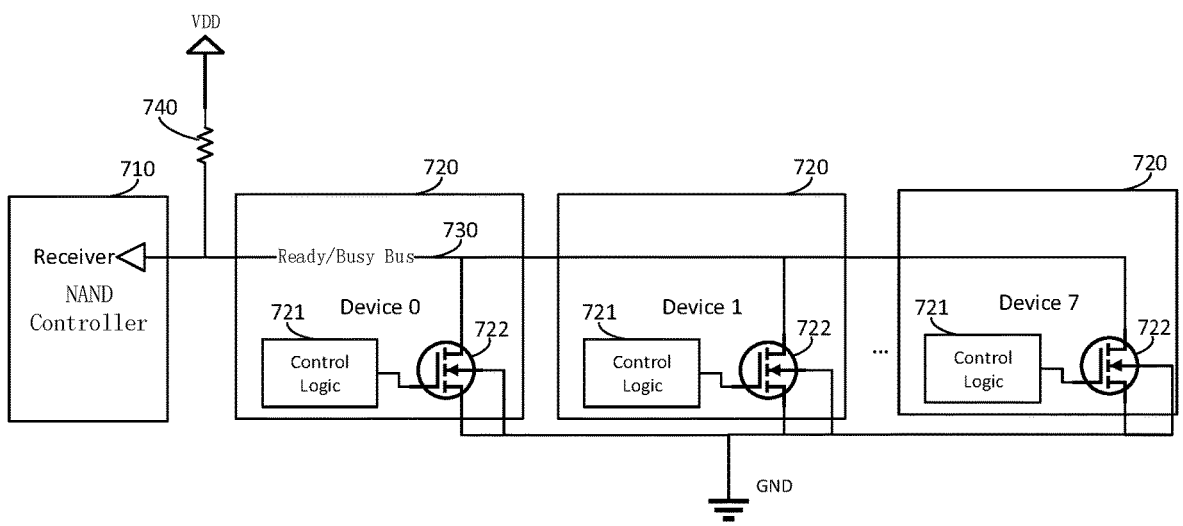
FIG. 7 schematically shows the Ready/Busy bus between the controller and the NAND devices as well as the driving circuit of the Ready/Busy Bus, as an example.

FIG. 7 schematically shows the Ready/Busy bus between the NAND flash controller and the NAND devices as well as the driving circuit of the Ready/Busy Bus.

As shown in FIG. 7, a receiver of the NAND flash controller 710 receives signal from 8 NAND devices 720, i.e., Device 0, Device 1, . . . , Device 7 via a common Read/Busy Bus 730. The Read/Busy Bus 730 is connected to voltage VDD (corresponding to the second logic level, "1" or "High") via a pull-up resistor 740 on the PCB.

Each NAND device 720 is connected to the Ready/Busy Bus by an open-drain driver, which can drive the Ready/Busy Bus 730 low if enabled by its control logic inside each NAND device. In this example, an open-drain driver is used to drive the Ready/Busy Bus 730. In some other embodiments, a push-pull driver may also be suitable to be used to drive the Ready/Busy Bus 730.

Specifically, the processor of Each NAND device 720 includes a control logic 721 and a transistor 722, forming the open-drain driver. In some embodiments, the transistor 722 is a MOSFET transistor.

The gate terminal of the transistor 722 is connected to the control logic 721. The control logic 721 is configured to control the transistor 722 by applying control voltage to the gate terminal.

One of the source terminal and drain terminal of transistor 722, for example, the source terminal, is connected to ground level GND (corresponding to the first logic level, logic "0" or "Low"). The other one of the source terminal and drain terminal of transistor 722, for example, the drain terminal, is connected to the Ready/Busy Bus 730.

When the control logic 721 applies a control voltage to the gate terminal to turn on the transistor 722, the open-drain driver of the NAND device 720 is enabled, and the level of the Ready/Busy Bus 730 is pulled down to the ground level GND. In other words, the Ready/Busy Bus 730 is driven to ground level GND (corresponding to the first logic level, logic "0" or "Low").

If none of the open drain driver is enabled by the NAND devices, the Ready/Busy Bus is then pulled up high to VDD (corresponding to the second logic level, "1" or "High") by a pull-up resistor 740 on the PCB.

The Ready/Busy Bus is connected to a receiver inside of the NAND flash controller. The NAND flash controller can determine a specific set of NAND status by receiving, detecting, and decoding the Ready/Busy signal patterns it receives from each individual NAND device.

As the Ready/Busy Bus 730 is shared by a plurality of NAND devices 720, an arbitration process is designed and presented (referring to FIG. 3) to enable only one NAND device to become the bus master and have control of the bus. In this example, both NAND Device 0 (NVM0) and Device 1 (NVM1) are trying to alert the NAND flash controller of its readiness by driving the Ready/Busy Bus 730 to logic "0" or "Low" for a period of time respectively, i.e., the first duration T1.

Once Device 0 disables the Ready/Busy output driver (i.e., turns off the transistor 722), it will continue to monitor the Ready/Busy Bus 730 for an extended period of time. If Device 0 continues to detect a "Low", or logic "0" on the Ready/Busy bus 730, it knows that another device is driving the bus and thus gives up the bus accordingly.

Meanwhile, Device 1 will also monitor the status of the Ready/Busy Bus 730 after it disables its output driver, i.e., turns off the transistor 722. In this case, it will find that the Ready/Busy Bus 730 is at a logic level of "1" or "High". So, it will assume master for the Ready/Busy Bus 730 and continue to send out its status information including logic ID and status code.

The operation of a NAND device on the Ready/Busy Bus may be identical to the example shown in FIG. 4.

The NAND device 720 will first send out an alert to the NAND flash controller 710 by driving the Ready/Busy Bus 730 low for a given time period, i.e., the first duration T1. The NAND device 720 may go through an arbitration process if there are other NAND devices 720 trying to control the Ready/Busy Bus 730 at the same time. The arbitration procedure may last for 10-100 ns.

After winning the arbitration, the NAND device 720 will subsequently send out its logic ID and status code to the NAND flash controller.

In one embodiment, the logic ID can be a 4-bit field while the status code can be an 8-bit field. The duration for sending each bit may be 10-50 ns.

The status code can include detailed status information including write protection, ready or busy, thermal flag, suspend, fail or pass, etc.

On the other hand, each NAND device can keep monitoring the bus for a duration longer than the end of the alert to the end of the status code, i.e., T2+Ts shown in FIG. 4. Only if the bus is at the second logic level, or logic "1" or "High" for the entire duration of T2+Ts, which means no other device is occupying the Ready/Busy Bus 730, the NAND device can send its alert.

Below is brief description of an example of a method of reporting real-time NAND device status through the Ready/Busy Bus 730.

During a NAND initiation process, the NAND flash controller 710 may assign a unique logic ID to each of the NAND devices 720.

Later, a NAND device 720 may drive the Ready/Busy Bus 730 to a low level GND (logic "0" or "Low") for a given time period T1 when it needs to indicate or report a status to the NAND flash controller 710, being either ready, busy or another status.

If there are multiple NAND devices 720 trying to claim control of the Ready/Busy Bus 730 at the same time, then an arbitration process is initiated among these NAND devices 720. In the end of the arbitration, only one NAND device 720 wins control and becomes the master of the Ready/Busy Bus 730.

The winning NAND device 720 will continue to send its logic ID and status code to the NAND flash controller 710.

The NAND flash controller 710 will then decode the logic ID and status code it receives from the NAND device 720, and proceeds with further command operations accordingly.

If a third NAND device other than the NAND devices participating the arbitration process is about to try to claim control of the Ready/Busy Bus 730, it shall avoid interfering the Ready/Busy Bus 730 when a first NAND device has already won the bus control. The third NAND device needs to poll the Ready/Busy Bus 730 for 3 times (at time point t1, t2 and t3 as shown in FIG. 5) before sending its alert, to determine whether the logic level of the Ready/Busy Bus 730 is the second logic level, or logic "1" or "High", or pulled up to the voltage VDD.

If the logic levels of the line at the three time points are all the second logic level, or logic "1" or "High", the Ready/Busy Bus 730 is not occupied by any other NAND device and is available for sending status information of the third NAND device to the NAND flash controller 710.

Here, as shown in FIG. 5, the gap (the third duration T3) between each polling (each of the three time points t1, t2 and t3) should be smaller than the gap (the second duration T2) between the alert and Logic ID, i.e., T3<T2. In addition, two T3 is greater than T2, i.e., 2T3>T2. This should ensure that the third device can poll a logic "0" or "Low" on the Ready/Busy Bus 730 when the first NAND device has already won the bus control, and thus stop further interfering with the Ready/Busy Bus 730.

Hereinabove, a new solid-state storage system is disclosed, which has a Ready/Busy signal bus that provides real time status of individual NAND devices to the controller. In various embodiments, a NAND device that is ready or needs to report a status may initiate an alert to the controller by driving the Ready/Busy signal bus low.

For each read/write command received from the controller, the NAND device will send an alert to the controller. For example, after the controller sends a read command, the controller may choose to continue to process commands with other devices until the controller receives an alert and a ready status from the NAND device. When the status shows that the NAND device is ready, the controller reads data from the NAND device.

After going through an arbitration process, only the NAND device that wins the arbitration may control the Ready/Busy bus and send the logic ID to the controller. The NAND device may further send the status code to the controller through the Ready/Busy signal bus.

The controller may decode the NAND's logic ID and status code from the NAND device and proceed with further commands.

In an exemplary embodiment, there is provided a method for sending the NAND device status through the Ready/Busy signal bus. The method may comprise: assigning a unique logic ID to each NAND device by a controller, asserting an alert to the controller by one or a plurality of NAND devices, going through an arbitration process so that only one NAND devices wins the Ready/Busy bus as the bus master, sending the individual logic ID and status code to the controller by the winning NAND device, and decoding the received device logic ID and status code by the controller to proceed with further commands.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-volatile memory comprising a processor; wherein the non-volatile memory is configured to:
    communicate with a controller through a channel shared by another device that is also configured to communicate with the controller;
    determine whether a line between the non-volatile memory and the controller is available for sending status information of the non-volatile memory to the controller;
    upon determining that the line is available, send an alert to the controller using the processor by driving the line to a first logic level for a first duration and stopping driving the line upon expiration of the first duration;
    upon expiration of the first duration, determine a logic level of the line;
    upon determining that the logic level of the line is a second logic level, send the status information of the non-volatile memory to the controller through the line using the processor upon expiration of a second duration.

2. The non-volatile memory of claim 1, wherein the non-volatile memory is configured to, upon determining that the logic level of the line is the first logic level, determine whether the line is available.

3. The non-volatile memory of claim 1, wherein the other device is another non-volatile memory.

4. The non-volatile memory of claim 1, wherein the status information of the non-volatile memory comprises a logic identification of the non-volatile memory, a status code of the non-volatile memory, or both.

5. The non-volatile memory of claim 1, wherein the non-volatile memory is configured to determine whether the line is available by:
    determining whether logic levels of the line at a first time point, a second time point and a third time point are the second logic level;
    wherein the first time point and the second time point are separated by a third duration and the second time point and the third time point are separated by the third duration;
    wherein that the logic levels of the line at the first time point, the second time point and the third time point are the second logic level indicates that the line is available;
    wherein the third duration is shorter than the second duration and is longer than one half of the second duration.

6. The non-volatile memory of claim 1, wherein the non-volatile memory is configured to determine whether the line is available by:
    determining whether logic levels of the line remain the second logic level for a sum of the second duration and a temporal length of the status information;
    wherein that the logic levels of the line remain the second logic level for the sum indicates that the line is available.

7. The non-volatile memory of claim 1, wherein the non-volatile memory is configured to receive from the controller and store a logic identification of the non-volatile memory.

8. A system comprising a controller, a first non-volatile memory and a second non-volatile memory;
    wherein the first non-volatile memory and the second non-volatile memory are configured to communicate with the controller through a same channel;
    wherein the first non-volatile memory and the second non-volatile memory are configured to send respective status information thereof to the controller through a same line;
    wherein the first non-volatile memory is configured to:
        determine whether the line is available for sending the status information of the first non-volatile memory to the controller through the line;
        upon determining that the line is available, send an alert to the controller using a processor in the first non-volatile memory by driving the line to a first logic level for a first duration and stopping driving the line upon expiration of the first duration;
        upon expiration of the first duration, determine a logic level of the line;
        upon determining that the logic level of the line is a second logic level, send the status information of the first non-volatile memory to the controller through the line using the processor upon expiration of a second duration.

9. The system of claim 8, wherein the first non-volatile memory is configured to, upon determining that the logic level of the line is the first logic level, determine whether the line is available.

10. The system of claim 8, wherein the status information of the first non-volatile memory comprises a logic identification of the first non-volatile memory, a status code of the first non-volatile memory, or both.

11. The system of claim 8, wherein the first non-volatile memory is configured to determine whether the line is available by:

determining whether logic levels of the line at a first time point, a second time point and a third time point are a second logic level;

wherein the first time point and the second time point are separated by a third duration and the second time point and the third time point are separated by the third duration;

wherein that the logic levels of the line at the first time point, the second time point and the third time point are the second logic level indicates that the line is available;

wherein the third duration is shorter than the second duration and is longer than one half of the second duration.

12. The system of claim 8, wherein the first non-volatile memory is configured to determine whether the line is available by:

determining whether logic levels of the line remain a second logic level for a sum of the second duration and a temporal length of the status information;

wherein that the logic levels of the line remain the second logic level for the sum indicates that the line is available.

13. The system of claim 8, wherein the controller is configured to send a logic identification of the first non-volatile memory to the first non-volatile memory and the first non-volatile memory is configured to store the logic identification.

14. The system of claim 8, wherein the controller is configured to communicate with the first non-volatile memory based on the status information of the first non-volatile memory.

15. The system of claim 8, wherein the controller is configured to enable or disable the first non-volatile memory and the second non-volatile memory based on the status information of the first non-volatile memory.

16. The system of claim 8, wherein the system is a solid-state drive (SSD), a flash drive, a mother board, a processor, a computer, a server, a gaming device, or a mobile device.

\* \* \* \* \*